March 21, 1944.   A. R. CARMINA   2,344,596
GAUGING AND SORTING MACHINE
Filed May 20, 1942   5 Sheets-Sheet 1

WITNESSES

INVENTOR
*Alfred R. Carmina*
BY
ATTORNEYS

March 21, 1944. A. R. CARMINA 2,344,596
GAUGING AND SORTING MACHINE
Filed May 20, 1942 5 Sheets-Sheet 2

INVENTOR
Alfred R. Carmina
BY
Munn, Liddy, Glaccum & Kane
ATTORNEYS

March 21, 1944.  A. R. CARMINA  2,344,596
GAUGING AND SORTING MACHINE
Filed May 20, 1942  5 Sheets-Sheet 3

WITNESSES
Geo. W. Naylor

INVENTOR
Alfred R. Carmina
BY
Munn, Liddy, Glaccum & Kane
ATTORNEYS

March 21, 1944.     A. R. CARMINA     2,344,596
GAUGING AND SORTING MACHINE
Filed May 20, 1942     5 Sheets-Sheet 4
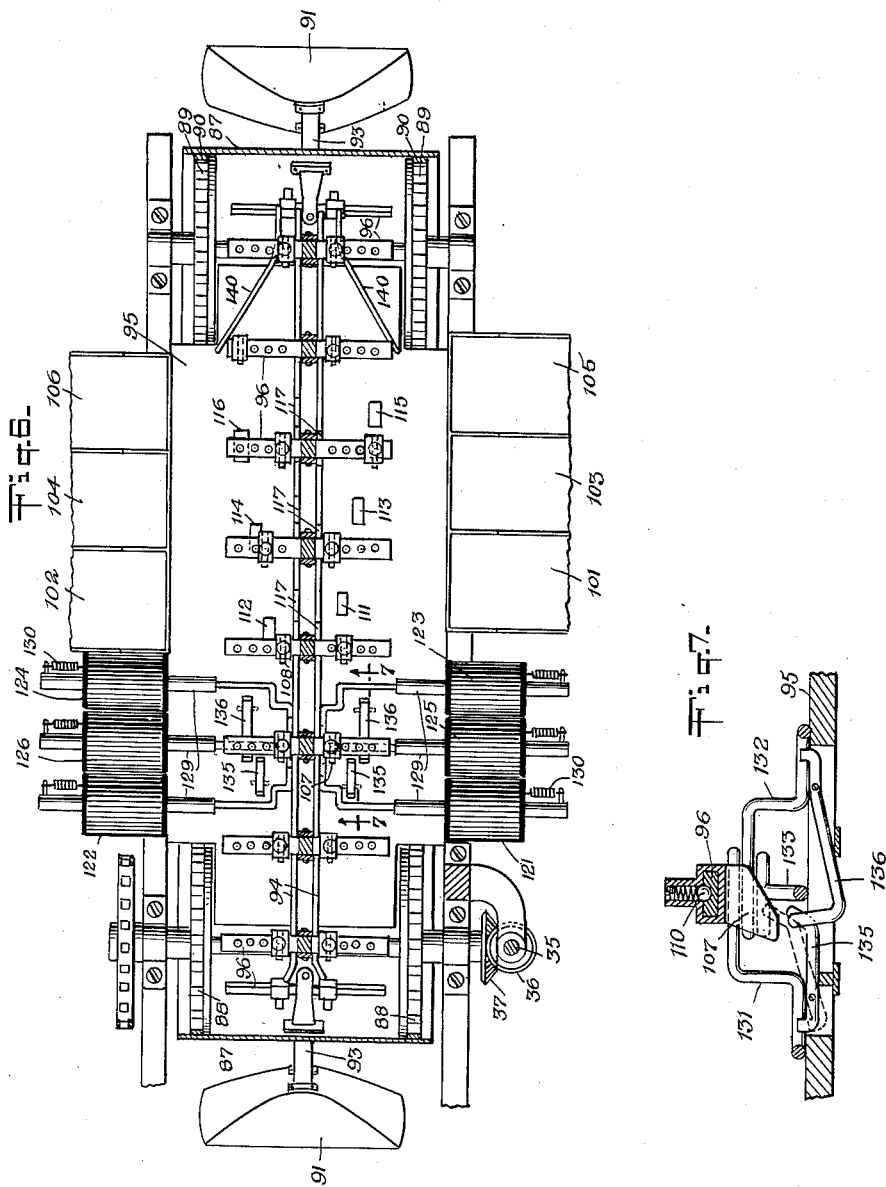
WITNESSES
INVENTOR
Alfred R. Carmina
BY
Munn, Liddy, Glaccum & Kane
ATTORNEYS March 21, 1944. A. R. CARMINA 2,344,596
GAUGING AND SORTING MACHINE
Filed May 20, 1942 5 Sheets-Sheet 5
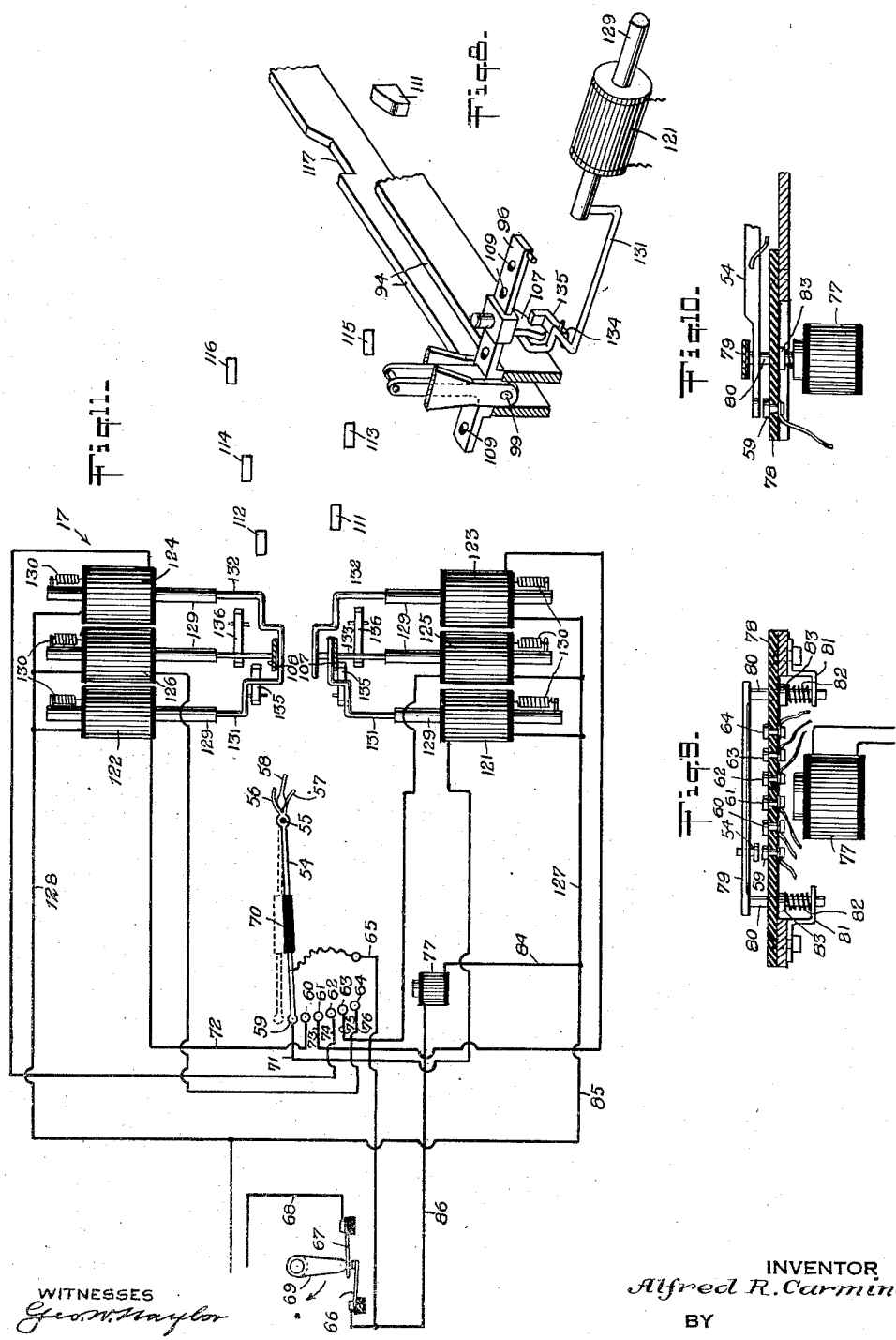
INVENTOR
Alfred R. Carmina
BY
Munn, Liddy, Glaccum & Kane
ATTORNEYS
WITNESSES
Geo. W. Naylor Patented Mar. 21, 1944

2,344,596

UNITED STATES PATENT OFFICE 2,344,596

GAUGING AND SORTING MACHINE

Alfred R. Carmina, Brooklyn, N. Y.

Application May 20, 1942, Serial No. 443,729

3 Claims. (Cl. 209—88)

This invention relates to an improved gauging and sorting machine for gauging the thickness of articles and thereafter assorting them in accordance with their gauge.

It is an object of the present invention to provide an improved machine of the above character which will automatically gauge the thickness or other dimension of articles, and will thereafter distribute the articles or assort them in accordance with the size of the article.

At the present time, it is customary to gauge the thickness of mica and various other materials and articles with a measuring gauge which will give a visual indication of the size of the article. Thereafter, the person operating the gauge will assort the articles in accordance with the visual indication. This is unsatisfactory because it requires the constant attendance of an operator and also gives rise to the possibility of error or mistake.

It is an object of the present invention to overcome these difficulties and disadvantages, and to provide an improved machine which will gauge the thickness or other dimension of the article and thereafter assort it or distribute it in accordance with its size.

A further object is the provision of improved apparatus of the above character which is positive in operation so as to eliminate or minimize the danger of error, and which is of rugged construction so that it will not readily get out of order.

Other objects will be apparent from the following description of the drawings, in which—

Fig. 6 is a sectional plan view in the direction of the arrows on the line 6—6 of Fig. 1;

Fig. 7 is a detail sectional view in the direction of the arrows on the line 7—7 of Fig. 6, showing a portion of the automatic cam setting mechanism;

Fig. 8 is a detail view in perspective of one unit in the automatic cam setting mechanism;

Fig. 9 is a detail view in transverse section of the control switch mechanism;

Fig. 10 is a view in section at right angles to the showing of Fig. 9; and

Fig. 11 is a diagram of the wiring circuits for the apparatus.

Figure 1:
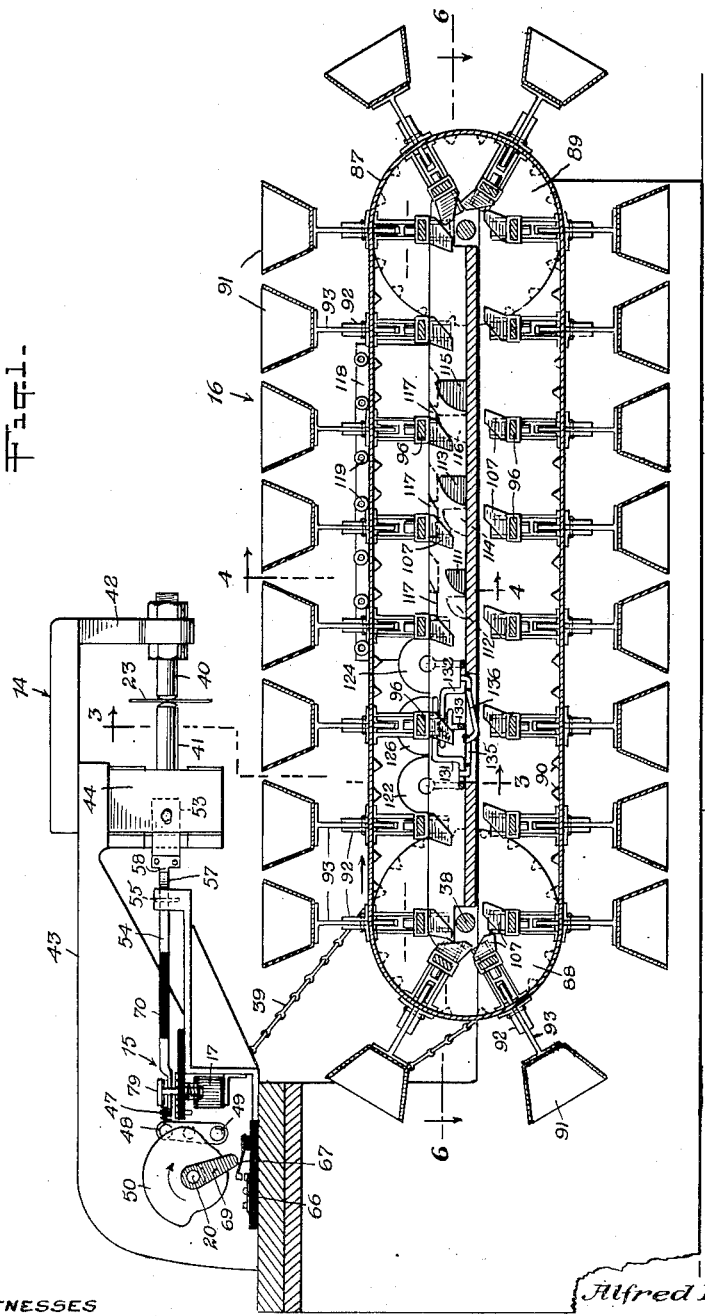
Fig. 1 is a longitudinal sectional view of gauging and sorting apparatus embodying my invention.

In the accompanying drawings I have illustrated my invention as embodied in apparatus for gaging and sorting pieces of mica. However, it should be understood that the invention is equally applicable to apparatus for gauging and sorting other materials and articles.

The illustrated apparatus comprises automatic feeding mechanism 12, gauging mechanism 14, control switch mechanism 15, operated by the gauging mechanism, conveyor mechanism 16 in which the pieces of mica which have been gauged are deposited, and the automatic cam setting mechanism 17 which automatically adjusts cams associated with the conveyor mechanism for causing the conveyor receptacles to discharge their contents in the proper troughs or bins.

The apparatus is provided with a primary drive shaft 20 from which the various portions of the apparatus are driven. The drive shaft in turn may be operated by any suitable prime mover or drive shaft, as by means of a belt 21.

To facilitate the understanding of my apparatus, I will separately describe each of the several portions of the apparatus listed above.

Automatic feeding mechanism

Figure 2:
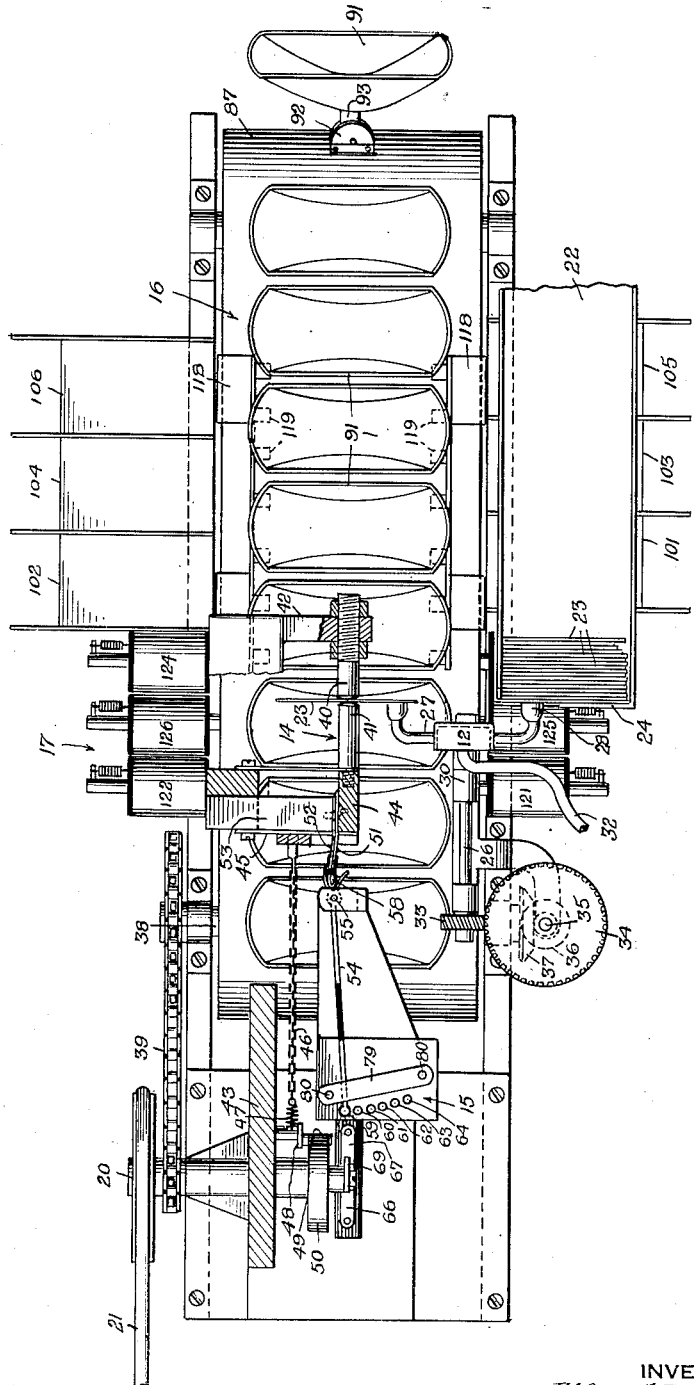
Fig. 2 is a top plan view of the apparatus.
Figure 3:
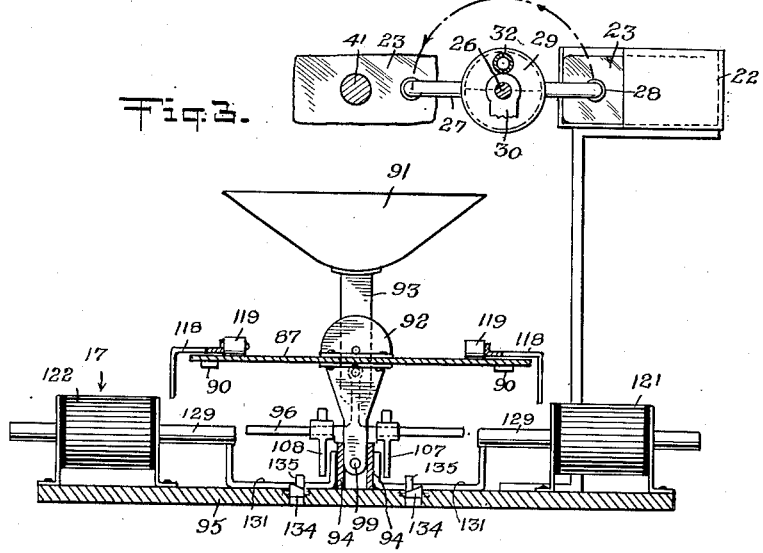
Fig. 3 is a sectional view in the direction of the arrows on the line 3—3 of Fig. 1.
Figure 5:
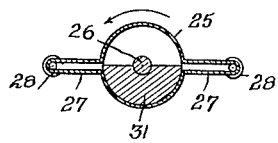
Fig. 5 is a cross sectional view of the automatic feeding device for feeding articles to the gauging mechanism.

The automatic feeding mechanism is shown in Figs. 2, 3 and 5, and comprises a trough 22 containing sheets of mica or other articles 23, which are to be gauged. The sheets of mica are fed by some suitable means (not shown) such as a spring, or gravity, towards the forward end of the trough, which is partially closed by means of the wall or flange 24.

As shown most clearly in Figs. 2 and 3, the trough 22 is spaced laterally from the gauging mechanism 14, and I provide automatically operating mechanism for transferring the sheets of mica individually from the trough to the gauging mechanism.

This mechanism comprises a small cylinder consisting of two mating or complementary portions 25 and 29, the portion 25 being mounted on a rotatable shaft 26 and being formed with oppositely disposed tubular arms 27 communicating at one end with the interior of the cylinder and being formed at their opposite ends with the enlarged heads 28 disposed at right angles to the inner ends of the arms.

The section 29 of the cylinder is fixedly mounted on bracket 30 so as to be held against rotation, and is provided internally with a block 31 filling one-half of the interior of the cylinder, in the manner most clearly shown in Fig. 5. A tube 32 also connects with the section 29 and communicates with the hollow portion of the interior of the cylinder at one end, and at its opposite end is connected with a vacuum pump or some other suitable source of suction (not shown).

Shaft 26 is connected with the primary driving mechanism of the apparatus so as to cause the rotation of the section 25 and of the arms 27, in synchronism with the remainder of the apparatus. This connection may consist of a spiral gear 33 mounted near the end of shaft 26 and meshing with a spiral gear 34 which, in turn, is mounted on the same shaft 35 as bevel gear 36 which, in turn, meshes with bevel gear 37 mounted upon shaft 38 which is operatively connected to the primary drive shaft 20 by means of sprocket chain 39.

It will thus be seen that the portion 25, of the cylinder, together with the connected arms 27, are caused to rotate. When the tubular arms 27 communicate with the hollow portion of the cylinder they are under suction. However, when they are obstructed by the solid portion 31 of the cylinder, they are no longer under suction. The arms are so arranged, as shown most clearly in Figs. 2 and 3, that when they are on the right hand side of their path of movement, they will engage with the first sheet of mica positioned in the trough 22. At this point the tubes are under suction and accordingly the sheet of mica will be held by suction against the enlarged head 28 of the arm.

As the arm rotates in a counter-clockwise direction, the sheet of mica is withdrawn from the top of the trough, and finally when the arm reaches the left hand side of its path of movement, the sheet of mica will be held in position in the gauging mechanism. As the arm continues its path of movement, the inner end thereof is abstructed by the block 31, with the result that the suction or partial vacuum is broken and the sheet of mica is released from the end thereof and will be deposited in one of the receptacles of the conveying mechanism.

*Gauging mechanism*

Any type of automatic gauging mechanism may be used in connection with my present apparatus.

In the accompanying drawings, particularly in Figs. 1 and 2, I have illustrated one standard type of gauging mechanism comprising a fixed gauging rod 40 and a movable gauging rod 41 between which the sheet of mica or other articles to be measured is positioned. The sheet of mica is placed against the stationary gauging rod 40 and the movable gauging rod 41 is then moved into contact with the opposite surface of the sheet so as to measure or indicate the thickness of the sheet.

The fixed rod 40 is suitably mounted in a bracket 42 supported upon the fixed frame 43, while the movable rod 41 is mounted in a block 44 which is supported from, but shiftable with respect to, the frame 43. The connection between the block 44 and frame 43 whereby the block may shift, comprises a plurality of spring arms 45, most clearly shown in Fig. 2. Thus, it will be seen that the block 44 and movable gauge rod 41 may be shifted with respect to the frame 43, bracket 42 and fixed rod 40. The spring arms 45 are so arranged, however, as to normally hold the end of the gauge rod 41 in contact with the end of fixed gauge rod 40.

To facilitate the automatic operation of the apparatus, I also provide suitable mechanism for automatically shifting the movable gauge rod 41 away from the gauge rod 40 to permit the sheets of mica or other articles to be gauged, to be inserted between the gauge rods. This mechanism comprises a chain or other flexible member 46 connected at one end to the spring arms 45, and at its opposite end to spring 47 which, in turn, is connected to one end of the lever 48, pivotally mounted at its central portion to the frame 43. The opposite end of the lever 48 is provided with a projecting stud 49 which serves as a follower, and is positioned in the path of movement of cam 50, mounted on drive shaft 20.

The cam 50 is provided with a dwell portion, as shown most clearly in Figs. 1 and 2 which engages stud 49, with the result that the lever exerts a pulling force on spring 47 and chain 46 which, in turn, shifts the spring arms 45, block 44 and movable gauge rod 41 to the left, separating the ends of the gauge rods and permitting the insertion of the sheet of mica or other article to be measured.

As the cam 50 rotates, and the dwell portion releases its engagement with the follower 49, the shiftable gauge rod 41 will move back towards the right, as viewed in Figs. 1 and 2, until it engages the sheet of mica disposed between the gauge rods. The relative position of the movable gauge rod 41 will then indicate the thickness or gauge of the sheet of mica.

To facilitate the determination and also utilization of changes in the relative position of the shiftable gauge rod 41, I provide a pair of spring metal strips 51 and 52 which are connected together at their left hand ends, as viewed in Fig. 2. At its right hand end, as viewed in the same figure, spring metal strip 51 is attached to the shiftable block 44, while the right hand end of spring strip 52 is attached to the fixed block 53, which, in turn, is mounted on the frame 43.

The spring strips 51 and 52 are so arranged that when the movable gauge rod 41 is in its normal position, in engagement with the end of the gauge rod 40, the spring strips will project in a straight line from the rear of the gauging mechanism.

Due to the fact that the left hand ends of the strips are fixedly secured together, the shifting of the shiftable gauge rod 41 to the left will cause the spring strips to bend towards the fixed arm 43, and the greater the distance between the movable gauge rod 41 and the fixed gauge rod 40, the greater the angle at which the spring strips will be disposed.

*Control switch mechanism*

The control switch mechanism is shown in Figs. 1, 2, 9, 10 and 11, and is operated by the gauging mechanism 14 and serves to control the operation of the automatic cam setting mechanism 17 to cause the conveyor receptacles to discharge their contents in the proper chute or bin and thereby assort or classify the sheets of mica in accordance with their gauge.

It consists of a contact arm 54 pivotally mounted at 55 near the end adjacent the gauging mechanism, the end adjacent the gauging mechanism is bifurcated, presenting a pair of arcuate arms 56 and 57, the inner surface of arm 56 being longitudinally concave, and the inner surface of arm 57 being longitudinally convex.

An elliptical bearing member 58, connected to the end of the spring strips 51 and 52, engages between the arms 56 and 57 so that when the spring strips shift laterally, assuming an angular position, as previously explained, the bearing member 58 causes the contact arm 54 to pivot. When the spring strips 51 and 52 are in their normal position, projecting in a straight direction from the rear of the gauging mechanism 14, the contact arm also projects straight rearwardly in the same direction, and assumes the position shown in dotted lines in Fig. 11.

As the shiftable gauge rod 41 shifts to the left, as viewed in Figs. 1 and 2, bearing member 58 causes the contact arm 54 to pivot in a counter-clockwise direction. In this connection, the end of the contact arm may engage any one of the six fixed contact points 59 to 64, inclusive, depending upon the relative position of the shiftable gauge rod 41. The contact arm 54 and contact points 59 to 64, inclusive, are connected in series with solenoids forming part of the automatic cam setting mechanism. Accordingly, when the contact arm 54 engages one of the contact points 59 to 64, inclusive, a particular solenoid will be operated in a manner hereinafter described, to cause a specific desired cam setting.

The circuit whereby this is accomplished is as follows: The contact arm 54 is connected by lead 65 to a spring contact 66 which cooperates with a second spring contact 67, connected by lead 68 to one side of a source of electric current. The spring contacts 66 and 67 are normally open. However, a cam arm 69, mounted on a primary drive shaft 20, causes the periodic closing of the contacts, thereby delivering electric current to the contact arm 54.

In order to prevent energization of the remainder of the machine through the contact arm, the arm may be provided with an insulating block 70 at a point between the pivotal connection 55 and the connection with lead 65, in the manner shown in Fig. 11. The contact points 59 to 64, inclusive, are connected by leads 71 to 76, inclusive, to the several solenoids of the automatic cam setting mechanism, as will be hereinafter described.

In the operation of the gauging mechanism, it will be seen that the automatic feed 12 delivers a sheet of mica to the space between gauge rod 40 and shiftable gauge rod 41 at a time when the dwell portion of cam 50 is in engagement with its follower 49, so that the shiftable gauge rod is spaced from the fixed gauge rod. Thereafter, the dwell portion of the cam releases its engagement with its follower, with the result that gauge rod 41 is released and shifts into engagement with the surface of the sheet of mica.

When shiftable gauge rod 41 moves towards the left, as viewed in Figs. 1 and 2, contact arm 54 is caused to pivot in a counter-clockwise direction over the top of the contact arms 59 to 64, inclusive, and the contact arm is so arranged as to be normally spaced above the contact points so as to prevent any wear on the points. When shiftable gauge rod 41 is released and again moves to the right, as viewed in Figs. 1 and 2, into engagement with the surface of the sheet of mica, the contact arm 54 will then pivot in a clockwise direction and will stop over the top of one of the contact points 59 to 64, depending upon the thickness of the sheet. If the sheet is very thin, it will stop over the top of contact point 59. If the sheet is relatively thick, it will stop over the top of contact point 64.

After the shiftable gauge rod 41 has engaged the sheet of mica and the contact arm has come to rest over the top of the contact points, cam arm 69 engages and operates the spring contacts 66 and 67 so as to energize the contact arm 54. Simultaneously the magnet 77 is energized by the closing of the spring contacts 66 and 67, and this causes the contact arm to shift downwardly into engagement with the contact point over which it is disposed.

The arrangement of the magnet 77 is most clearly shown in Figs. 9 and 10, where it will be seen that it is disposed beneath the insulating plate 78, immediately beneath the contact points 59 to 64. Above the contact points 59 to 64 and above the contact arm 54 is the armature 79 of the magnet, the said armature consisting of a bridge-like member having a pair of supporting posts 80 at its opposite ends which extend through the insulating plate 78 and are mounted in the brackets 81. So as to normally maintain the armature 79 in an elevated position, I provide springs 82 between the brackets 81 and collars 83 formed on the posts 80. When the magnet 77 is energized, it pulls the armature 79 downwardly into engagement with the contact arm 54, forcing it downwardly into engagement with the fixed contact over which it is disposed, which operation causes the completion of the circuit to one of the solenoids in the automatic cam setting mechanism. Magnet 77 is connected by leads 84 and 85 to one side of the source of electric current and by lead 86 to the spring contact arm 66.

*Conveyor mechanism*

The conveyor mechanism 16 which receives the sheets of mica after they have been gauged, and automatically assorts and deposits them in the proper chute or bin in accordance with their thickness, is shown in Figs. 1, 2, 3, 4 and 6, and comprises an endless belt 87 supported at opposite ends on the pairs of sprocket wheels or pulleys 88 and 89.

In order to insure positive engagement between the sprocket wheels and belt, I preferably provide inwardly projecting teeth 90 on the belt which engage with complementary sockets formed in the sprockets 88 and 89. The endless belt is driven in a clockwise direction, as viewed in Fig. 1, by means of sprockets 88 which are fixed to the shaft 38 which, in turn, is driven by sprocket chain 39 from the primary drive shaft 20.

The endless belt and the primary drive shaft 20 are so synchronized that when the primary drive shaft 20 makes one complete revolution, the endless belt 87 moves a distance equivalent to the distance between the receptacles 91, carried by the belt. In the present instance, the distance between the receptacles 91 occupies 60° on the circumference of the driving sprockets 88, and accordingly the ratio between the speed of rotation of shaft 20 and shaft 38 should be 6 to 1.

The receptacles 91 consist of small troughs pivotally mounted adjacent the central portion of the belt in spaced relationship so that they may tilt laterally in either direction. The specific mounting for the receptacles, shown in the drawings, comprises pairs of brackets 92 projecting through slots formed in the central portion of the belt and fixedly secured to the belt by rivets or the like. Between each pair of brackets 92 is pivotally mounted an arm 93 supporting one of the receptacles 91.

While the receptacles are positioned in the upper flight of the belt 87, the lower portion of the brackets 92 depends downwardly between a pair of tracks 94 supported on platform 95 located intermediate the two flights of the belt.

Figure 4:
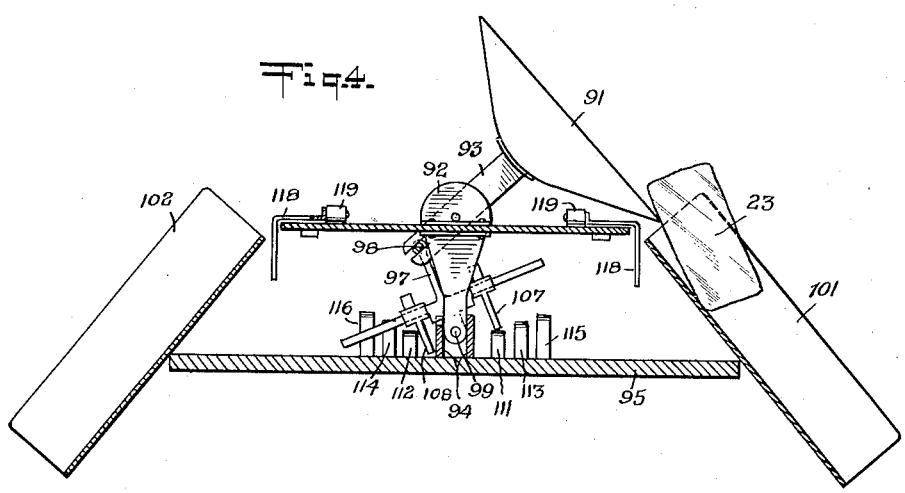
Fig. 4 is a sectional view in the direction of the arrows on the line 4—4 of Fig. 1, showing one of the conveyor receptacles discharging its contents.

Due to the fact that the receptacles 91 are pivoted on the brackets 92, it will be seen that they they may tilt laterally in either direction and assume the position shown in Fig. 4, so as to discharge the mica or other contents deposited in the receptacle.

So as normally to maintain the receptacle in upright position, I provide a guide member in the form of a transverse bar or rod 96, adapted to rest and ride upon the upper surface of the tracks 94 and provided with a centrally positioned upright portion 97 having a stud 98 engaging in a slot formed in the lower portion of arm 93. Beneath the upright 97 the rod 96 is formed with a depending portion which is pivotally connected to the lower portion of the brackets 92, as shown at 99.

It will thus be seen that the guide member serves normally to maintain the receptacles 91 in an upright position. In the path of travel around the endless belt, each receptacle passes beneath the gauging mechanism, and after the piece of mica has been gauged, it is released by the automatic feeding mechanism and is deposited in the receptacle. Thereafter, it is conveyed by the receptacle to one of the six troughs, indicated by the numerals 101 to 106, inclusive. The receptacle then tilts laterally in the direction of one of the troughs and discharges the piece of mica. The specific trough in which the mica is discharged is determined by the gauge or thickness thereof.

In order to cause the receptacle to tilt laterally in this manner, and discharge its contents, I provide a pair of shiftable cams 107 and 108 on each of the transverse bars 96. The cams 107 and 108 may shift laterally on the transverse bar and I provide on the bar a number of predetermined positions, marked by the recesses 109, which are engaged by the spring-pressed balls 110 carried by the shiftable cam mountings.

Cooperating with the shiftable cams are six fixed cams mounted on the platform 95 and indicated by the numerals 111 to 116, inclusive. The cam 111 is positioned adjacent the trough 101. The cam 112 is positioned adjacent the trough 102, and so on. It will thus be seen that shiftable cam 107 may be adjusted to engage any one of the fixed cams 111, 113 or 115, and that shiftable cam 108 may be adjusted to engage any one of the fixed cams 112, 114 or 116. When the shiftable cams are in their innermost position adjacent the tracks 94, they will not engage any of the fixed cams.

When shiftable cam 107 is adjusted to engage fixed cam 111 it will cause transverse bar 96 to pivot towards the left, in the manner shown in Fig. 4, with the result that the receptacle will be caused to tilt towards the right, as viewed in the same figure, discharging its contents into trough 101. Similarly, by adjusting the shiftable cam 107 to engage fixed cams 113 or 115, the receptacle can be caused to discharge its contents in either of troughs 103 or 105. Also, by adjusting the cam 108 to engage cams 112, 114 or 116, the receptacle can be caused to discharge its contents in any one of the troughs 102, 104 or 106.

Accordingly, the specific trough in which the receptacle is caused to discharge its contents, is determined by the setting of the adjustable cams 107 and 108, and the setting of the cams is controlled by the control switch mechanism 15. The specific contact 59 to 64, which is engaged by the contact arm 54 is, in turn, determined by the gauge or thickness of the piece of mica in the gauging mechanism 14. Under the circumstances, it will be appreciated that the receptacles 91 serve to assort or classify the pieces of mica in accordance with their gauge or thickness.

To facilitate the tilting of the transverse bars 96 when the adjustable cams engage the fixed cams, I preferably provide the tracks 94 with cut-out portions 117 on the sides of the tracks opposite the fixed cams. Also, in order to prevent the elevation or distortion of belt 87 when the receptacles are tilted to discharge their contents, I provide guide brackets 118 adjacent the troughs and having portions overlapping the upper surface of the top flight of the belt, preferably provided with rollers 119 to minimize friction.

*Automatic cam setting mechanism*

In order to provide for the automatic setting of the adjustable cams 107 and 108 in accordance with the gauge or thickness of the pieces of mica gauged by the gauging mechanism, I provide six electromagnets or solenoids, indicated by the numerals 121 to 126, inclusive, adapted to set the adjustable cam 107 or 108 so as to engage the fixed cams 111 to 116, inclusive. The solenoid 121 is arranged so as to set adjustable cam 107 to engage fixed cam 111, while solenoids 123 and 125 are arranged so as to set the same cam to engage fixed cams 113 and 115, respectively. Similarly, solenoids 122, 124 and 126 are arranged to set cam 108 to engage fixed cams 112, 114 and 116, respectively.

It will be seen that one end of the winding of solenoid 121 is connected to the fixed contact 59 by lead 71, while one end of the winding of solenoid 122 is connected to fixed contact 60 by lead 72, and one end of the winding of solenoids 123, 124, 125 and 126 are connected by leads 73, 74, 75 and 76 to the fixed contacts 61, 62, 63 and 64, respectively. The opposite ends of the windings of the solenoids are connected by leads 127 and 128 to the opposite side of the source of electric current.

Each of the solenoids is provided with shiftable armature cores 129, normally held in advanced position by means of the springs 130. When the solenoids are energized they retract the armature cores against the tension of the springs 130. The armatures of the respective solenoids are provided with arms adapted to engage the adjustable cams 107 or 108 and to set them to the proper predetermined position when the solenoids are energized. The arms connected to the armatures of solenoids 121 and 122 are similar, and are indicated by the numeral 131. Similarly, the arms connected to the armatures of solenoids 123 and 124 are similar, and are indicated by the numeral 132, and the arms connected to the armatures of solenoids 125 and 126 are also similar, and are indicated by the numeral 133.

The solenoids are positioned immediately beneath the gauging mechanism 14 and the arms 131 to 133 are provided with hooked offset portions, in the manner most clearly shown in Fig. 7, adapted to engage the adjustable cams 107 and 108 of the receptacle 91 when it is positioned beneath the gauging mechanism so as to receive the piece of mica after it has been gauged.

The operation of the arms 131, 132 and 133 of both sets of solenoids is similar and accordingly, in order to understand the manner in which the solenoids operate to set or adjust the cams 107 or 108, it will only be necessary to describe the operation of one group of arms. We will accordingly describe the operation of solenoids 121, 123, 125, and their associated arms so as to show the manner in which they adjust cam 107.

When solenoid 121 is energized, it retracts arm 131, causing the offset portion thereof, indicated at 134, to engage pivotally mounted cam stop 135, shifting it upwardly. At the same time the hooked end of arm 131 engages adjustable cam 107 and shifts it outwardly along the transverse bar 96 until the adjustable cam engages the cam shaft 135. At this point there is preferably an aperture or recess 109 in the upper surface of bar 96 which is engaged by the spring-pressed ball 110 in the adjustable cam mounting. The adjustable cam is then adjusted or set so as to engage fixed cam 111 when the receptacle is shifted by the conveyor belt to the proper predetermined position. It will be seen that, when solenoid 121 is deenergized, the armature is released and cam stop 135 again drops back into position out of the path of movement of the adjustable cam.

When solenoid 123 is energized, it causes arm 132 to retract until the offset portion thereof engages cam stop 136, which is similar to cam stop 135, but is positioned nearer to the edge of the supporting platform 95 so as to permit a greater outward movement of arm 132. Arm 132 accordingly will shift adjustable cam 107 outwardly on bar 96 until cam stop 136 has been elevated and engaged by the adjustable cam. Another aperture or recess 109 is located at this point on the upper surface of bar 96 and is engaged by the spring-pressed ball 110. The adjustable cam 107 is then in the path of movement of fixed cam 113.

When solenoid 125 is energized, it causes arm 133 to retract. This arm extends outwardly in a straight direction from the armature and no cooperating cam stop is provided for this arm. Accordingly, arm 133 and its associated armature is permitted to shift its entire normal distance when the solenoid 125 is energized. Arm 133 is so arranged as to engage cam 107 when solenoid 125 is energized and shift it into the path of movement of fixed cam 115.

The operation of solenoids 122, 124 and 126 is similar to that of the solenoids just described, with the exception that they cause adjustable cam 108 to shift into the planes or paths of fixed cams 112, 114 or 116, respectively.

At the right hand end of the conveyor, as viewed in Fig. 6, angularly disposed guide tracks 140 are provided to return the adjustable cams 107 and 108 to their normal position.

Operation

The operation of my improved gaging and sorting machine is as follows: The automatic feeding mechanism transfers a piece of mica from the feed trough 22 to the gauging mechanism 14, at a time when shiftable gauge rod 41 is retracted from fixed gauge rod 40. When the piece of mica is positioned in front of fixed gauge rod 40 the shiftable gauge rod is released and permitted to shift into contact with the surface of the piece of mica.

The specific point at which the shiftable gauge rod is arrested by the surface of the mica determines the angle at which the member 58 is disposed, and accordingly determines the contact point 59 to 64 which is engaged by the contact arm 54. If the mica is relatively thick, contact arm 54 will engage contact 64. If it is relatively thin, contact arm 54 will engage contact 59.

After contact arm 54 shifts to a position over the proper contact point, cam arm 69 causes spring contact 67 to engage spring contact 66, with the result that electromagnet 77 is energized, with the result that contact arm 54 is drawn downwardly into engagement with the selected contact point, and the circuit of the proper solenoid 121 to 126 is completed. The energized solenoid causes adjustable cam 107 or 108 to shift to the proper position so as to engage one of the fixed cams 111 to 116. At the same time the gauging of the piece of mica is completed and it is released by the automatic feeding mechanism and drops into the conveyor receptacle positioned beneath the gauging mechanism.

When the receptacle moves to a position adjacent the proper trough, the adjustable cam 107 or 108 engages one of the fixed cams, depending upon their setting, with the result that the receptacle is tilted and the contents thereof discharged into one of the troughs.

It will thus be seen that my improved apparatus automatically gauges a sheet of mica or any other material or article, and automatically assorts it or classifies it in accordance with its gauge. It will also be seen that the apparatus is positive in its operation and eliminates or minimizes the danger of error.

It should be understood that the apparatus shown in the accompanying drawings is merely intended as illustrative of my invention, and I do not intend to limit my invention to the specific embodiment shown and described herein.

I claim:

1. Gauging and sorting apparatus including gauging means for gauging the thickness of sheet material conveyor means comprising an endless belt positioned beneath the gauging means and having a plurality of pivotally mounted receptacles thereon, each adapted to receive an article which has been gauged by the gauging means, said receptacles being shiftable between an upright position and a tilting position to discharge their contents, a plurality of stations adjacent the conveyor and each adapted to receive a sheet of material of different predetermined thickness, means for normally holding the receptacles in upright position, means including adjustable cams for causing the receptacles to tilt and discharge their contents at any one of the stations, and control means for adjusting the cams in accordance with the thickness of the sheet material being gauged, comprising a plurality of fixed contacts, a movable contact arm pivotally mounted adjacent the fixed contacts and operatively connected to the gauging means so as to be shiftable over the top of any one of the fixed contacts depending upon the thickness of the sheet material being gauged, means including an electromagnet positioned beneath the fixed contacts for drawing the movable contact arm into engagement with a fixed contact, a plurality of circuits controlled by the contacts, a plurality of electromagnets, each connected in one of the circuits and an armature for each of the electromagnets formed so as to engage and adjust an adjustable cam when its electromagnet is energized.

2. In a machine of the class described, the combination of a continuously traveling support, conveyor receptacles arranged in spaced relation with respect to each other, means tiltably connecting each of said receptacles with said support and including a fixed bearing bracket on said support and an arm on the receptacle; notched tracks, said bracket riding in contact with said tracks to steady said support, a rocker connected with each bracket and normally riding on said tracks during part of its travel with the bracket to prevent rocking movement thereof, the notches in said tracks enabling the rocker to be rocked, said rocker being articulated with the arm of the related receptacle to hold the latter in non-tilted position during the travel of the receptacle to a predetermined point, and means to operate the rocker to tilt its receptacle at said point.

3. In a machine of the character described; a traveling support having receptacles, each of said receptacles being movable to an upright position and a tilted position, means for normally holding each receptacle in the upright position, means including cams for causing each of the receptacles to move into the tilted position; and control mechanism for adjusting said cams to cause the selective operation of said receptacles, said mechanism including a plurality of fixed contacts, a movable contact arm adjacent the fixed contacts cooperable therewith, and means including an electromagnet positioned to draw the contact arm into engagement with a fixed contact, a plurality of circuits controlled by said contacts, a plurality of electromagnets in said circuits respectively, and an armature for each of said last electromagnets to engage and adjust a particular cam when its electromagnet is energized.

ALFRED R. CARMINA.